United States Patent [19]

Sakuragi et al.

[11] Patent Number: 4,678,844
[45] Date of Patent: Jul. 7, 1987

[54] CHELATE, CROSSLINKED POLYETHYLENEIMINE RESIN HAVING 2-HYDROXY BENZOYL GROUP

[75] Inventors: Masako Sakuragi, Sakuramura; Kunihiro Ichimura, Yatabemachi, both of Japan

[73] Assignees: Agency of Industrial Science & Technology; Ministry of International Trade & Industry, both of Tokyo, Japan

[21] Appl. No.: 832,346

[22] Filed: Feb. 24, 1986

[30] Foreign Application Priority Data

Mar. 4, 1985 [JP] Japan .................................. 60-42490

[51] Int. Cl.$^4$ ........................... C08G 73/00; C08J 3/24
[52] U.S. Cl. .................................... 525/417; 525/186; 525/540
[58] Field of Search ........................ 525/417, 186, 540

[56] References Cited

U.S. PATENT DOCUMENTS

| 3,951,815 | 4/1976 | Wrasidlo | 525/417 |
| 3,963,806 | 6/1976 | Dornte | 525/417 |
| 4,537,937 | 8/1985 | Cawlfield et al. | 525/417 |

Primary Examiner—Harold D. Anderson
Attorney, Agent, or Firm—Oblon, Fisher, Spivak, McClelland & Maier

[57] ABSTRACT

A novel chelate resin is produced by causing a 2-hydroxybenzoic acid derivative to react upon a high molecular compound, i.e. a cross-linked polyethyleneimine or a cross-linked polyethyleneimine derivative, thereby linking a 2-hydroxybenzoyl group to the nitrogen atom in the imine chain of the high molecular compound. This chelate resin is capable of collecting, by adsorption and at high efficiency, such a metal as uranium dissolved in a trace amount in water.

5 Claims, No Drawings

CHELATE, CROSSLINKED POLYETHYLENEIMINE RESIN HAVING 2-HYDROXY BENZOYL GROUP

FIELD OF THE INVENTION AND RELATED ART STATEMENT

This invention relates to a novel chelate resin suitable for collection, by adsorption, of such a metal as uranium dissolved in a trace amount in seawater, other natural water, or plant effluent and to a method for the production thereof.

Generally, an adsorbent is used for collecting by adsorption, a metal ion such as uranium dissolved in a trace amount in seawater. The adsorbent is desired to have a high adsorbing velocity and a large adsorbing capacity. It is also required to have sufficient stability to resist the substance under treatment and the liquid used as for the elution of the adsorbate.

Efforts are being continued to develop chelate resins capable of selectively isolating uranium from seawater at high yield (Hiroaki Egawa, "ucaiyokagaku (Oceanographic Science)", Vol. 15, page 648, 1983) and chelate resins possessing an amidoxime group, a hydroxamic acid residue, and dithiocarbamate group have been demonstrated to serve as good adsorbents for uranium in seawater. These chelate resins, however, have the weakpoint that their coordinate functional groups are susceptible to hydrolysis so that once they adsorb metal ions, desired elution of the adsorbate for their regeneration and reuse can be attained only with difficulty. The chelate resin possessing an amidoxime group excels all the other chelate resins so far developed. This resin is such that when it had adsorbed uranium, the elution of the adsorbed uranium from the resin requires exposure of the resin to an acidic water, with an inevitable result that the amidoxime group will be hydrolyzed. To suit actual use, therefore, it is necessary to develop a chelate resin able to resist hydrolysis on exposure to the acidic water, namely to develop one with enhanced waterproofness.

OBJECT AND SUMMARY OF THE INVENTION

Development of an adsorbent which adsorbs a metal ion dissolved in a trace amount in water, permits the adsorbed metal ion to be eluted and recovered with ease, and continues to function efficiently through repeated cycles of adsorption and desorption has been strongly desired.

This invention has been produced for the purpose of answering the need. An object of this invention is to provide a novel chelate resin which recovers, by adsorption a metal ion such as, for example, uranium dissolved in a trace amount in natural water or plant effluent, enjoys high waterproofness, resists hydrolysis on contact with water during the course of the adsorption of metal ion and the elution of adsorbed metal ion, and permits repeated use (as an adsorbent) through regeneration.

Another object of this invention is to provide a method for the production of the novel chelate resin mentioned above.

To accomplish the object described above according to this invention, there is provided a novel chelate resin which is characterized by comprising a high molecular compound selected from the group consisting of cross-linked polyethyleneimines and cross-linked polyethyleneimine derivatives and having a 2-hydroxybenzoyl group of the general formula:

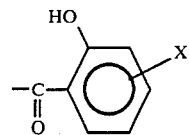

(wherein X stands for one member selected from the class consisting of hydrogen atom, hydroxyl group, and nitro group) linked to the nitrogen atom in the imine chain of the high molecular compound.

In accordance with this invention, the novel chelate resin mentioned above is obtained by causing an active 2-hydroxybenzoic acid derivative represented by the general formula:

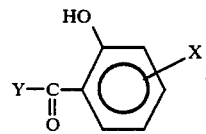

(wherein X has the same meaning as defined above and Y stands for one member selected from the class consisting of chlorine atom, azide group, phenyl group, and substituted phenyl groups) to react upon one high molecular compound selected from the group consisting of cross-linked polyethyleneimines and cross-linked polyethyleneimine derivatives.

DETAILED DESCRIPTION OF THE PREFERRED EMBODIMENTS

The circumstances behind the perfection of the present invention will be described. As already mentioned, some of the chelate resins have been demonstrated to function as highly desirable adsorbents. The chelate resins so far known to the art, however, are not stable against water. This fact constitutes a fatal defect which prevents such chelate resins from being used efficiently as adsorbents for metal ions dissolved in water.

The inventors, in the belief that the objects of the invention could be attained by improving the existing chelate resins and freeing them from the aforementioned drawbacks, continued a study and consequently perfected this invention.

It is well known that the Schiff base of salicylaldehyde is an excellent ligand. The Schiff base, however, is not practicable as an adsorbent because the carbon-nitrogen double bond of this base is hydrolyzed under acidic conditions. In the light of this knowledge, the inventors inferred at some of the compounds which possess a phenyl group of the type having a hydroxyl group attached to the ortho position exhibit a desirable ligand function and enjoy high stability enabling them to avoid undergoing hydrolysis on contact with water and, based on this theory, continued various studies. As a result, they found that a salicylamide derivative has a satisfactory ligand function. It was further ascertained that incorporation of this derivative in a high molecular compound gives birth to a stable chelate resin having the ligand linked thereto, namely a chelate resin serving as a highly desirable adsorbent for metal ions dissolved in a trace amount in water.

What is obtained by linking this ligand to a high molecular compound does not always exhibit the desired ability to collect metal ions. The inventors, through a continued study, found that the chelate resin produced by using a specific hydrophilic high molecular compound acquires an improved ability to adsorb metal ions. Finally by singling out a polyethyleneimine type high molecular compound as a matrix fullfilling all the requirements, i.e. hydrophilicity, and ease of incorporation of a ligand, they perfected this invention.

The chelate resin of this invention has a structure in which a 2-hydroxybenzoyl group is linked to the nitrogen atom of a polyethyleneimine chain. In a branched type polyethyleneimine, the nitrogen atoms occur in the three forms of primary, secondary, and tertiary amines in a ratio of about 1:2:1 and the aliphatic amine serving effectively as a ligand is preserved in its unaltered form without fail. It is, therefore, inferred that the amine-form nitrogen is suitable for forming a chelate bond with a metal ion through cooperation with a phenol-form hydroxyl group. Thus, the amine-form nitrogen plays an effective role in the improvement of the chelate forming ability. Further, since this chelate resin uses a water-soluble polyethyleneimine as a raw material, it enjoys the advantge that it possesses high hydrophilicity and exhibits a high chelate forming speed.

As a natural consequence, the chelate resin is enabled to adsorb a metal ion dissolved in a trace amount in water in a high ratio. In the novel chelate resin of this invention which is desirable from the practical point of view, the nitrogen atoms linked to the 2-hydroxybenzoyl group account for a proportion in the range of 2 to 20% of all the nitrogen atoms in the imine chain. If the nitrogen atom content is less than 2%, the chelate resin's ability to adsorb metal ions is not sufficient. If the nitrogen atom content exceeds 20%, the chelate resin is deficient in hydrophilicity and in adsorbing speed. The molecular weight of the uncross-linked polyethyleneimine is in the range of 1000 to 100000. The reason for this range is that the insolubilization due to cross-linking is attained with difficulty when the molecular weight is less than the lower limit of the range and the viscosity is too high to permit easy handling when the molecular weight is larger than the upper limit of the range.

A cross-linked polyethyleneimine or a derivative thereof, which is high molecular compound indispensable to the production of the chelate resin of this invention, will be described. As the high molecular compound mentioned above, the resin obtained by graft polymerizing a polyethyleneimine onto cross-linked polystyrene or the linear or branched polyethyleneimine insolublized through cross-linking with a suitable cross-linking agent can be used. The high molecular compound can be used as molded in the shape of granules, fine particles, a membrane, or fibers. One method for producing a cross-linked polyethyleneimine high molecular compound in the form of granules consists in cross-linking a commercially available aqueous polyethyleneimine solution in reversed-phase suspension. To be more specific, this method comprises suspending the aqueous polyethyleneimine solution in an organic solvent immiscible with water, stirring the suspension thereby keeping the polyethyleneimine dispersed in the form of granules, and adding a cross-linking agent such as, for example, N,N'-methylenebisacrylamide to the stirred suspension thereby giving rise to a granular resin insolubilized through cross-linking. The cross-linked polyethyleneimine high molecular compound, when cleaned with alcohol, can be used in the following reaction.

Now, the method for incorporating the 2-hydroxybenzoyl group into the high molecular compound of a polyethyleneimine or a derivative thereof (hereinafter referred to as "cross-linked polyethyleneimine resin") will be described. The cross-linked polyethyleneimine resin is suspended in a solvent and an active 2-hydroxybenzoic acid derivative represented by the general formula (I) is caused to react upon the suspended resin. The compound of the general formula (I) which is used in the reaction may have some other substituent such as, for example, chlorine atom, hydroxyl group, or nitro group attached to the benzene ring thereof. When this compound possesses an active group capable of acylating an amino group or imino group, the active group can be effectively utilized in the reaction. The compounds enumerated below are typical examples of the compound usable advantageously.

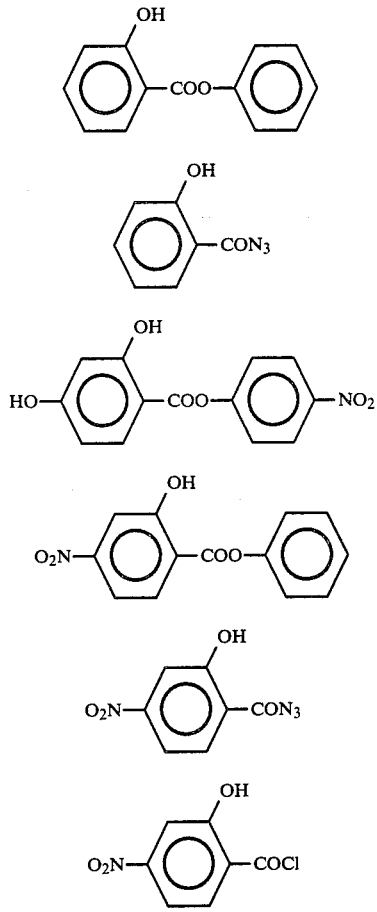

The solvent for dispersion of cross-linked polyethyleneimine resin is required to be incapable or sparingly capable of reacting with the compound represented by the general formula (I). Dioxane, tetrahydrofuran, dimethylformamide, dimethylacetamide, etc. are particularly desirable examples of the solvent. The reaction temperature is in range of room temperature to the boiling point of the solvent to be used, preferably in the range of 40° to 100° C. The reaction time, though variable with the reaction temperature, the kind of the compound, and the ratio of incorporation of the functional group possessing the ligand function desired, is desired to fall in the range of 1 to 48 hours.

When the functional group is to be incorporated in a relativey small amount, the reaction proceeds smoothly because the polyethyleneimine itself possesses a catalytic activity. When this reaction is desired to proceed more quickly or the functional group is desired to be incorporated in a larger amount, addition of such a tertiary amine as triethylamine, tributylamine, or pyridine proves effective.

The 2-hydroxybenzoyl group represented by the general formula (II) can be linked freely to the polyethyleneimine resin as described above. Practically, the chelate resin to be produced is enabled to acquire a sufficient ability to adsorb metal ions when the 2-hydroxybenzoyl group is linked to a proportion in the range of 2 to 20% of all the nitrogen atoms in the imine chain of the resin.

The chelate resin obtained by the present invention possesses an outstanding ability to adsorb various metal ions. It can efficiently collect, by adsorption, the uranium contained in an extremely low concentration of the order of several ppb in seawater, for example. It is also capable of efficiently collecting, by adsorption, other valuable metals such as, for example, cobalt, nickel, copper, zinc, and strontium and permitting redy recovery thereof, by easy elution.

It also permits easy recovery of metal ions dissolved in a minute amount in a plant effluent, for example. The chelate resin as the adsorbent can be used after the adsorbed metal ion has been eluted. Thus, the chelate resin of the present invention serves advantageously as an adsorbent for the recovery of metal ion.

Now, the present invention will be described more specifically below with reference to working examples. It should be noted, however, that this invention is not limited to these working examples.

EXAMPLE 1

Into a mixture of 450 ml of hexane with 270 ml of carbon tetrachloride 0.68 g of sorbitan monooleate was added and the resultant mixture was stirred. To the stirred mixture was added 50 g of an aqueous 30% polyethyleneimine solution. Then, the container was kept cooled with ice and a solution of 2.668 g (0.01744 mole) of N,N'-methylenebisacrylamide in a mixed solvent of 17.5 ml of methanol with 15 ml of water was added dropwise thereto. After completion of the dropwise addition, the reaction mixture was stirred at 40° C. for 24 hours. After completion of the reaction, the particles produced were separated by filtration, thoroughly washed with methanol and hexane, and then dried. The infrared spectrum of the dry particles indicated a peak at 1650 cm$^{-1}$, which is attributable to C=O stretching vibration of amide group, indicating that the polyethyleneimine had incorporated the amide group therein. The reaction product weighed 16.58 g, representing a yield of 94%.

In 30 ml of dioxane, 3 g of the cross-linked polyethyleneimine particles produced as above at first was added and then 1.2 g ($5.6 \times 10^{-3}$ mole) of phenyl salicylate and 0.57 g ($5.6 \times 10^{-3}$ mole) of triethylamine were added thereto. The resultant mixture was heated at 100° C. for five hours for reaction. The solid reaction product was separated by filtration, washed with methanol and dioxane, and vacuum dried to obtain a granular adsorbent of the present invention.

The infrared spectrum of this granular indicated peaks at 760 cm$^{-1}$ and 870 cm$^{-1}$, indicating that the resin had incorporated the salicylamide group therein.

The solid reaction product weighed 3.65 g. The amount of the unaltered phenyl salicylate remaining in the reaction solution, based on the ultraviolet spectrum, was found to be $5.1 \times 10^{-4}$ mole, indicating that 91% of the used phenyl salicylate had participated in the reaction. Thus, the amount of the salicylamide group contained in the synthetized resin (i.e. the solid reaction product) was $1.4 \times 10^{-3}$ mole/g. The resin so produced was identified, by infrared absorption spectrum and elementary analysis, to be a novel chelate resin of the present invention.

The resin so obtained was sifted to collect beads of 20 to 32 mesh. A column was packed with 50 mg of the collected beads. Seawater (collected along the Oarai coast of Japan) was passed at a flow rate of 200 cm$^3$/hr through the column for 10 days for adsorption of metal ions in the seawater. The resin was washed with water and immersed in 20 cm$^3$ of an aqueous 3% ammonium carbonate solution, heated and refluxed for 12 hours to effect elution of the adsorbate into the aqueous ammonium carbonate solution. The resin was separated by filtration. The amount of uranium contained in the aqueous ammonium carbonate solution was determined by the method of fluorometric analysis using a fusing agent composed of sodium carbonate, potassium carbonate, and sodium fluoride. It was consequently found that 4.2 μg of uranium had been desorbed into 20 cm$^3$ of the aqueous ammonium carbonate solution, indicating that 84 μg of uranium had been adsorbed per g of the adsorbent. This fact means that 3% of the trace uranium in the seawater had been adsorbed.

EXAMPLES 2-7

In dioxane, polyethyleneimine beads insolubilized by cross-linking with N,N'-methylenebisacrylamide and phenyl salicylate were heated at 100° C. for five hours for reaction by following the procedure of Example 1. Six species of chelate resin of this invention, A1 through A6, were synthesized which had $1.7 \times 10^{-4}$ to $1.8 \times 10^{-3}$ mole/g of salicylamide group contents. The conditions of the synthesis and the salicylamide group contents of the adsorbent calculated through the determination of unaltered phenyl salicylate by the procedure of Example 1 are shown in Table 1.

The samples of the synthetized adsorbents, A1 through A6, were sifted to collect beads of 20 to 32 mesh by following the procedure of Example 1. Six columns were packed with 50 mg of beads of 20 to 32 mesh collected respectively from the six samples. The seawater was passed at a flow rate of 200 cm$^3$/hr through these columns for varying lengths of time, 4 to 30 days. Then, the beads formed were heated in the aqueous ammonium carbonate solution to effect elution of the uranium adsorbed on the beads and the amount of uranium desorbed into the desorbent was determined by the method of fluorometric analysis. The results are shown in Table 2.

The adsorbent A3, (cross-linked polyethyleneimine beads having a salicylamide group content of $4.7 \times 10^4$ mole/g) had a particulary large uranium adsorption capacity.

EXAMPLE 8

In 30 ml of dioxane, 3 g of polyethyleneimine beads insolubilized by cross-linking with N,N'-methylenebisacrylamide and 0.38 g ($1.65 \times 10^{-3}$ mole) of phenyl 2,4-dihydroxybenzoate and 0.17 g ($1.7 \times 10^{-3}$ mole) of triethylamine were added thereto and heated at 100° C. for five hours by following the procedure of Example 1. Consequently, there was obtained a chelate resin (adsorbent) of this invention containing a 2,4-dihydroxybenzamide group as shown below.

The infrared spectrum of this resin showed a peak at 760 cm$^{-1}$ and 870 cm$^{-1}$, indicating that the chelate resin had incorporated the 2,4-dihydroxybenzamide group.

The solid reaction product weighed 3.10 g. The amount of the unaltered phenyl 2,4-dihydroxybenzoate remaining in the reaction solution was determined by taking the ultraviolet absorption spectrum. The results indicate that the amount of the unaltered phenyl 2,4-dihydroxybenzoate was $6.2 \times 10^{-4}$ mole and further that 62% of the phenyl 2,4-dihydroxybenzoate used had participated in the reaction. The results mean that the amount of the 2,4-dihydroxybenzamide group in the synthesized resin was $3.2 \times 10^{-4}$ mole/g.

The adsorbent so produced was sifted to collect beads of 20 to 32 mesh. A column was packed with 50 mg of the collected beads. Seawater from the same source as that used in Example 1 was passed at a flow rate of 200 cm$^3$/hr through the column for 10 days. The adsorbent was heated in the same aqueous ammonium carbonate solution as used in Example 1 to effect elution of the uranium adsorbed on the adsorbent. The amount of the uranium desorbed into the desorbent was determined by the method of fluorometric analysis. The results indicate that the adsorbent had adsorbed 127 μg of uranium per g.

EXAMPLE 9

In 40 ml of dimethylformamide, 3.39 g (0.022 mole) of 2,4-dihydroxybenzoic acid, 6.06 g (0.022 mole) of diphenyl-phosphoryl azide, and 2.22 g (0.22 mole) of triethylamine were held at 0° C. for reaction at 0° C. for 24 hours. The resultant reaction mixture and 0.66 g of cross-linked polyethyleneimine added thereto were allowed to react at 0° C. for 72 hours and then at room temperature for 50 hours. The beads consequently formed were separated by filtration, washed with methanol, and dried. The adsorbate thus obtained weighed 1.40 g.

The amount of 2,4-dihydroxybenzamide introduced into the absorbent was found to be $3.8 \times 10^{-3}$ mole/g, based on the increase in weight.

TABLE 1

| | | Polyethyleneimine resin substituted with salicylamide | | | | |
|---|---|---|---|---|---|---|
| | | Conditions of synthesis | | | Amount of | Salicylamide group |
| Example | Resin | Cross-linked polyethyleneimine | Phenyl salicylate | Triethylamine | adsorbent produced | content (mole/g) |
| 2 | A-1 | 2.95 g | 0.12 g | 0.06 g | 3.01 g | $1.7 \times 10^{-4}$ |
| 3 | A-2 | 3.05 g | 0.24 g | 0.12 g | 3.18 g | $3.3 \times 10^{-4}$ |
| 4 | A-3 | 3.02 g | 0.35 g | 0.17 g | 3.20 g | $4.7 \times 10^{-4}$ |
| 5 | A-4 | 3.04 g | 0.48 g | 0.23 g | 3.30 g | $6.4 \times 10^{-4}$ |
| 6 | A-5 | 3.03 g | 0.73 g | 0.35 g | 3.41 g | $9.2 \times 10^{-4}$ |
| 7 | A-6 | 3.02 g | 1.70 g | 0.81 g | 3.84 g | $1.8 \times 10^{-3}$ |

TABLE 2

| Capacity of polyethyleneimine resin substituted with salicylamide to adsorb uranium from seawater | | | |
|---|---|---|---|
| Example | Resin | Number of days of passage of seawater | Amount of uranium adsorbed | Ratio recovery of uranium from seawater |
| 2 | A-1 | 4 | 21 μg/g | 2% |
| 3 | A-2 | 4 | 68 μg/g | 6% |
| 4 | A-3 | 4 | 152 μg/g | 13% |
| 5 | A-4 | 10 | 45 μg/g | 2% |

TABLE 2-continued

| Capacity of polyethyleneimine resin substituted with salicylamide to adsorb uranium from seawater | | | |
|---|---|---|---|
| Example | Resin | Number of days of passage of seawater | Amount of uranium adsorbed | Ratio recovery of uranium from seawater |
| 6 | A-5 | 30 | 62 μg/g | 2% |
| 7 | A-6 | 4 | 23 μg/g | 2% |

What is claimed is:

1. A chelate resin, comprising a high molecular compound of granules of cross-linked polyethyleneimines obtained by suspending an aqueous polyethyleneimine solution in an organic solvent and cross-linking and insolubilizing said polyethyleneimine by addition of a cross-linking agent to the resultant suspension, said resin having a 2-hydroxybenzoyl group of the general formula:

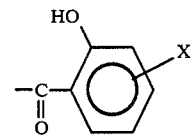

wherein X stands for one member selected from the class consisting of hydrogen atom, hydroxyl group, and nitro group linked to the nitrogen atom in the imine chain of said high molecular compound.

2. A chelate resin according to claim 1, wherein the nitrogen atom to which said 2-hydroxybenzoyl group is linked constitutes to 20% of all the nitrogen atoms in said imine chain.

3. A method for the production of a chelate resin comprising a high molecular compound of granules of cross-linked polyethyleneimines obtained by suspending an aqueous polyethyleneimine solution in an organic solvent and cross-linking and insolubilizing said polyethyleneimine by addition of a cross-linking agent to the resultant suspension, said resin having a 2-hydroxybenzoyl group of the general formula:

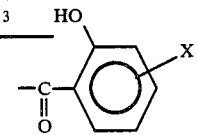

wherein X stands for one member selected from the class consisting of hydrogen atom, hydroxyl group, and nitro group linked to the nitrogen atom in the imine chain of said high molecular compound, which method comprises reacting an active 2-hydroxybenzoic acid derivative of the formula:

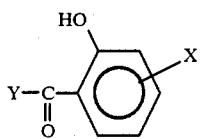

wherein X has the same meaning as defined above and Y stands for one member selected from the class consisting of chlorine atom, azide group, phenyl group, and substituted phenyl groups with said high molecular compound.

4. A method according to claim 3, wherein the nitrogen atom to which said 2-hydroxybenzoyl group is linked constitutes 2 to 20% of all the nitrogen atoms in said imine chain.

5. A method according to claim 3, wherein said 2-hydroxybenzoic acid derivative is at least one member selected from the group consisting of

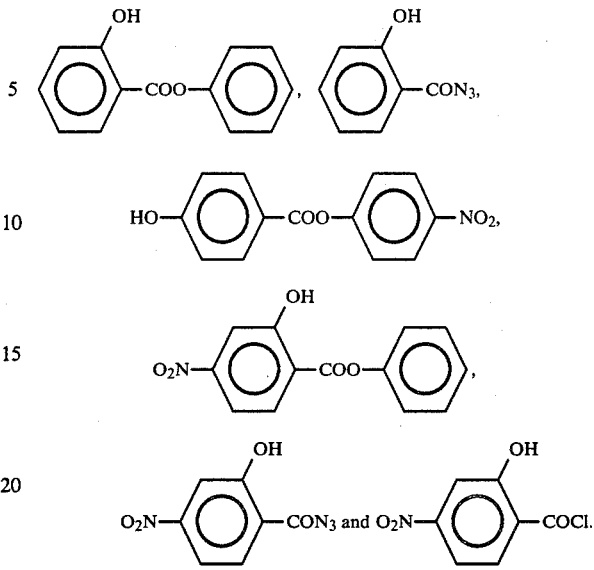

* * * * *